Jan. 21, 1936.     E. D. RAPISARDA     2,028,410
METHOD AND APPARATUS FOR HANDLING STARCH IN CONFECTIONERY MANUFACTURE
Filed July 19, 1934     11 Sheets-Sheet 1
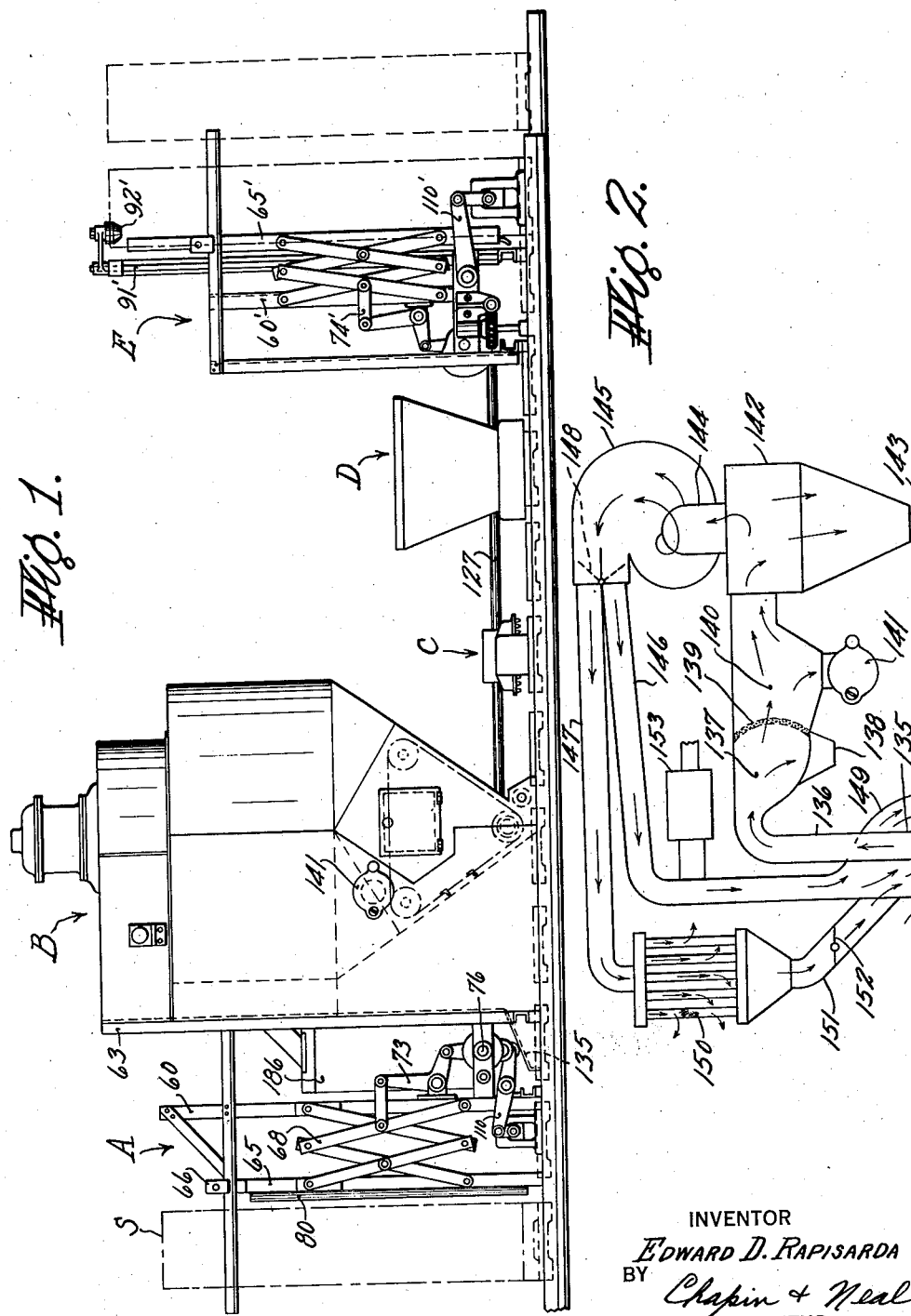
INVENTOR
EDWARD D. RAPISARDA
BY Chapin & Neal
ATTORNEYS Jan. 21, 1936.  E. D. RAPISARDA  2,028,410
METHOD AND APPARATUS FOR HANDLING STARCH IN CONFECTIONERY MANUFACTURE
Filed July 19, 1934  11 Sheets-Sheet 2
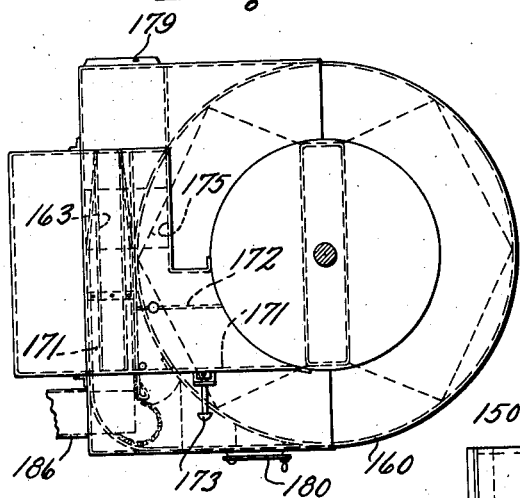
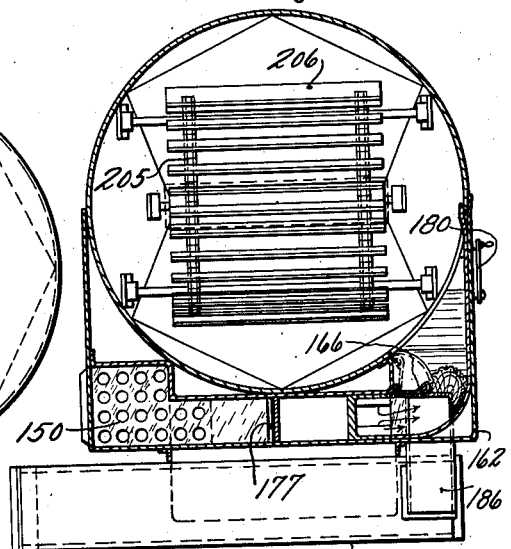
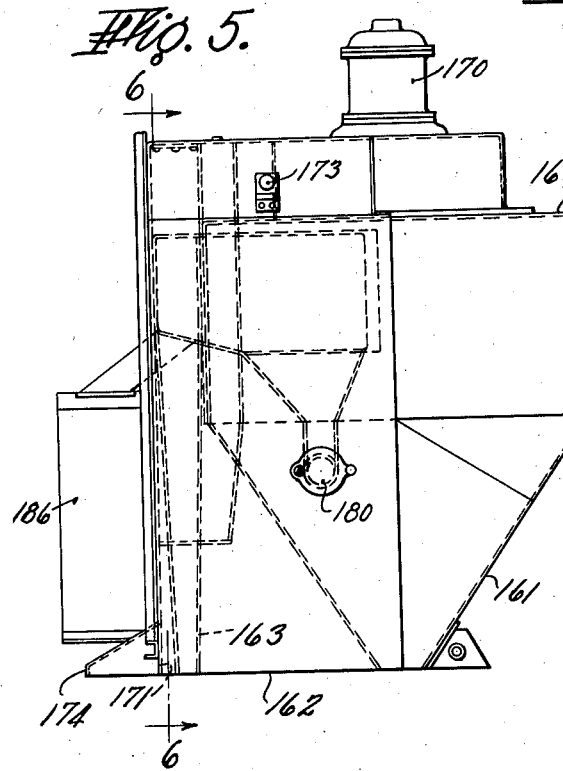
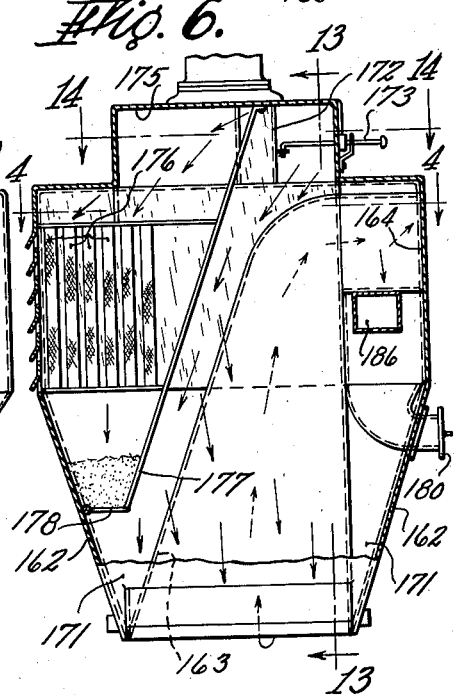
INVENTOR
EDWARD D. RAPISARDA
BY
Chapin & Neal
ATTORNEYS

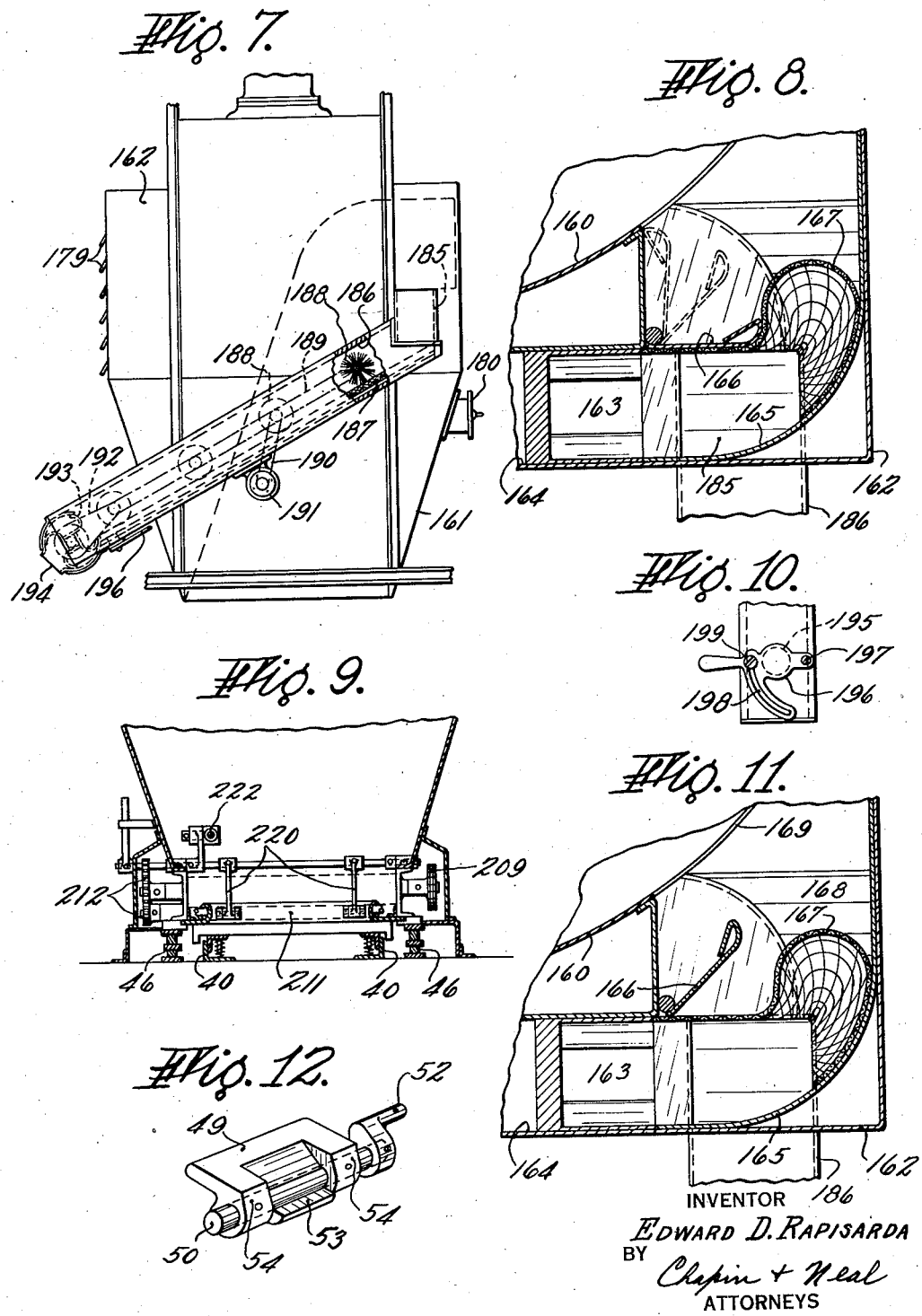

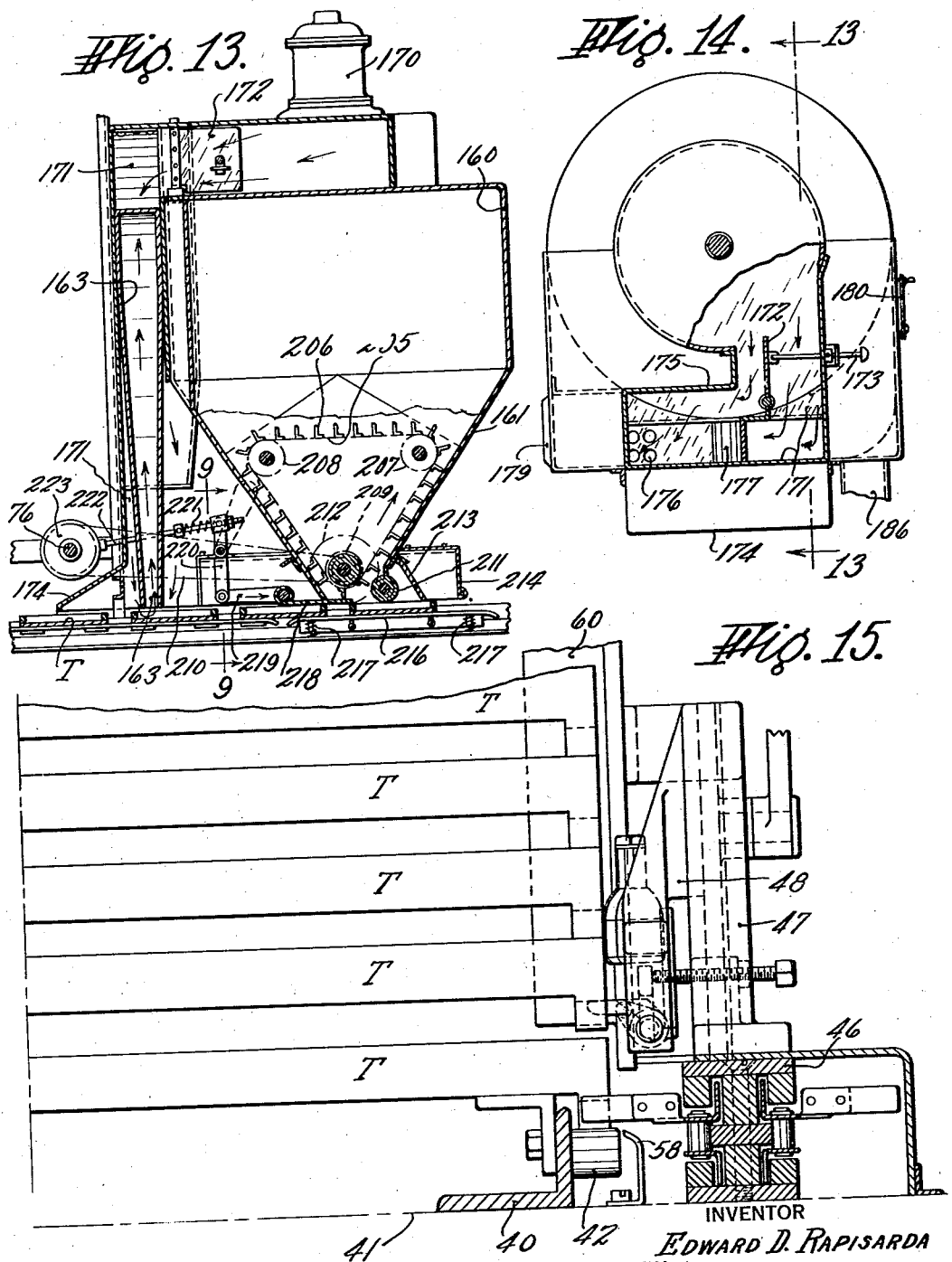

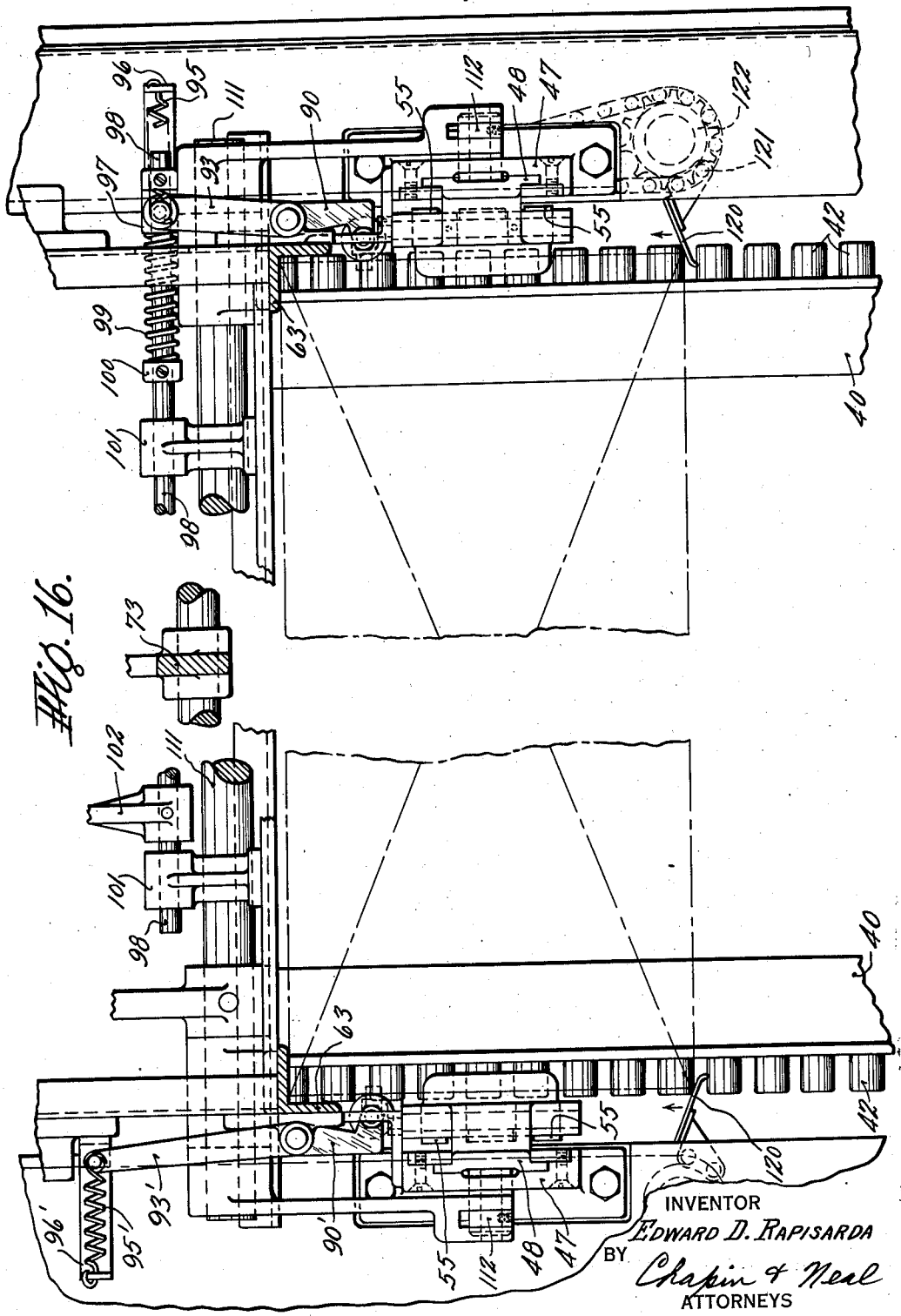

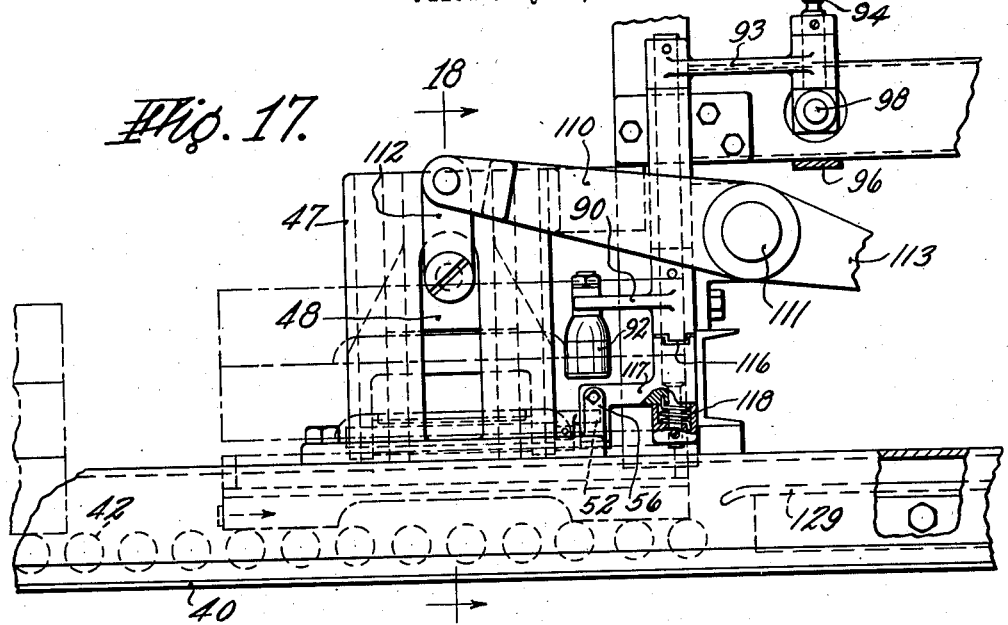

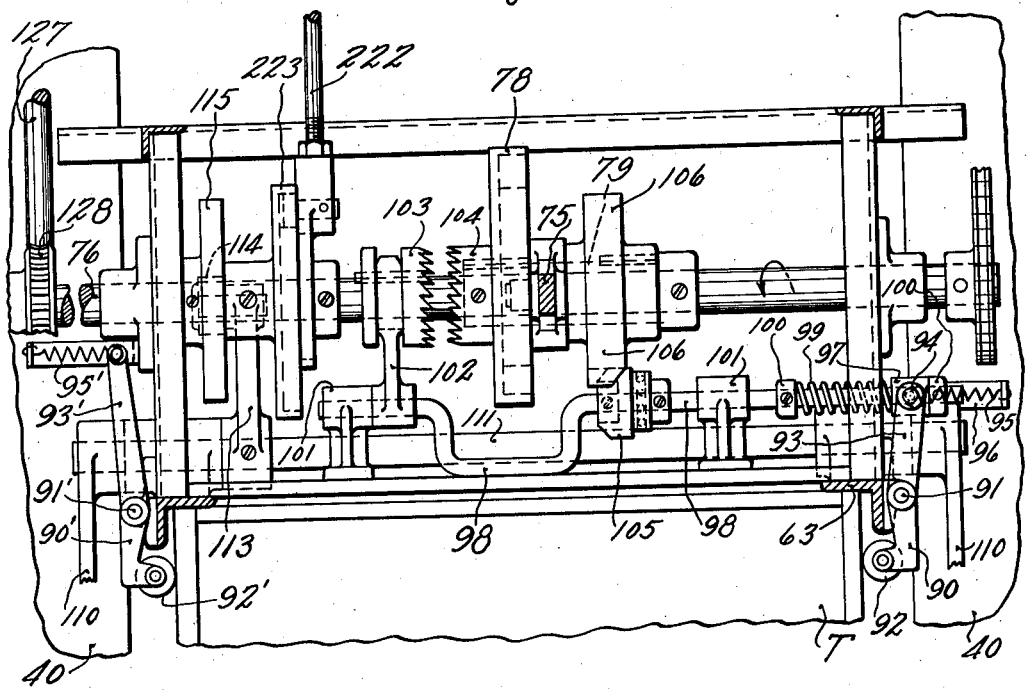

Jan. 21, 1936.  E. D. RAPISARDA  2,028,410
METHOD AND APPARATUS FOR HANDLING STARCH IN CONFECTIONERY MANUFACTURE
Filed July 19, 1934   11 Sheets-Sheet 8
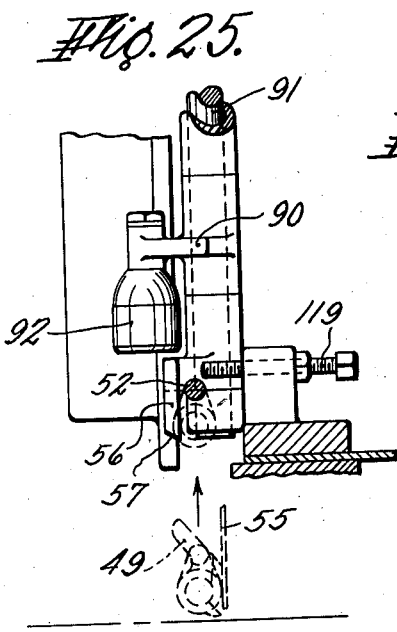
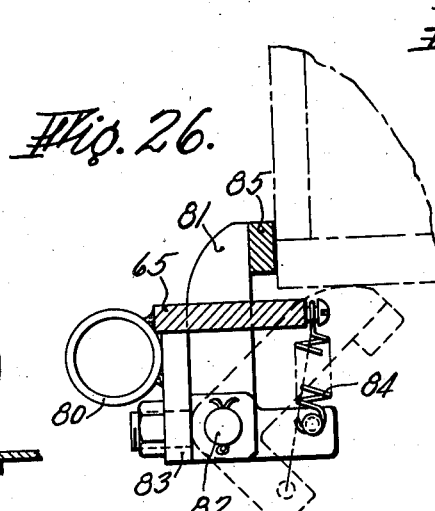
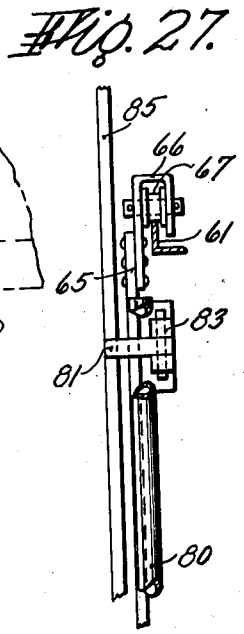
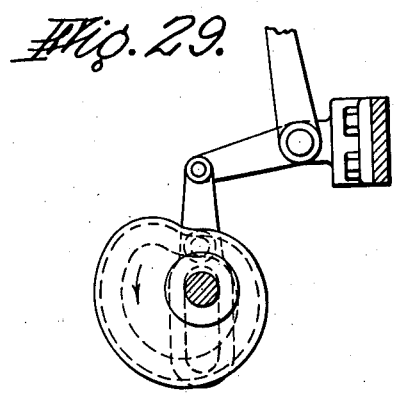
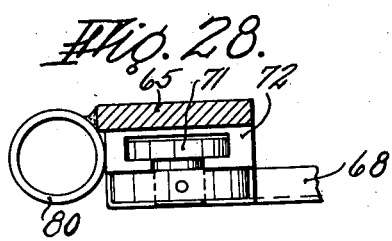
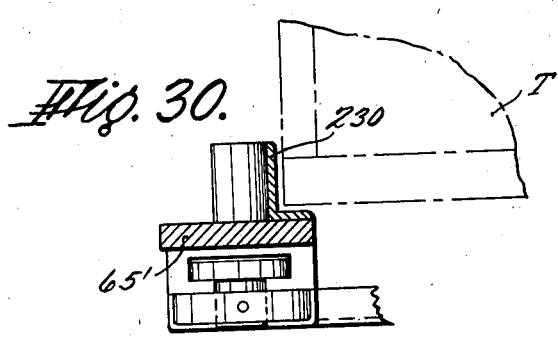
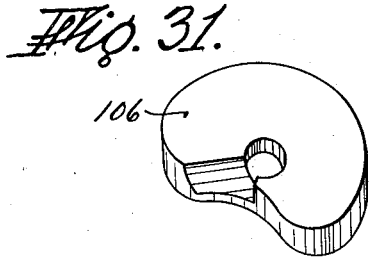
INVENTOR
EDWARD D. RAPISARDA
BY Chapin & Neal
ATTORNEYS

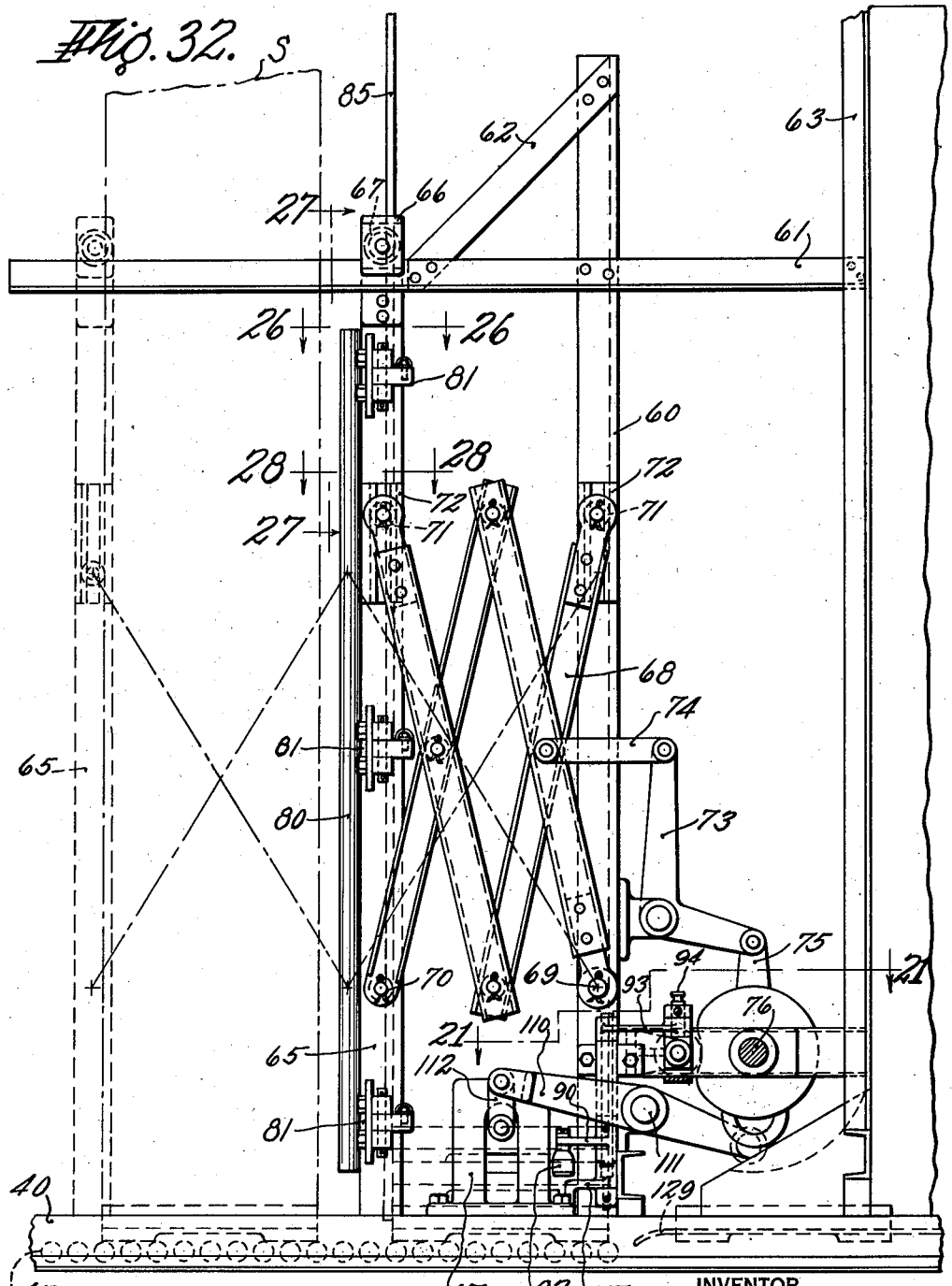

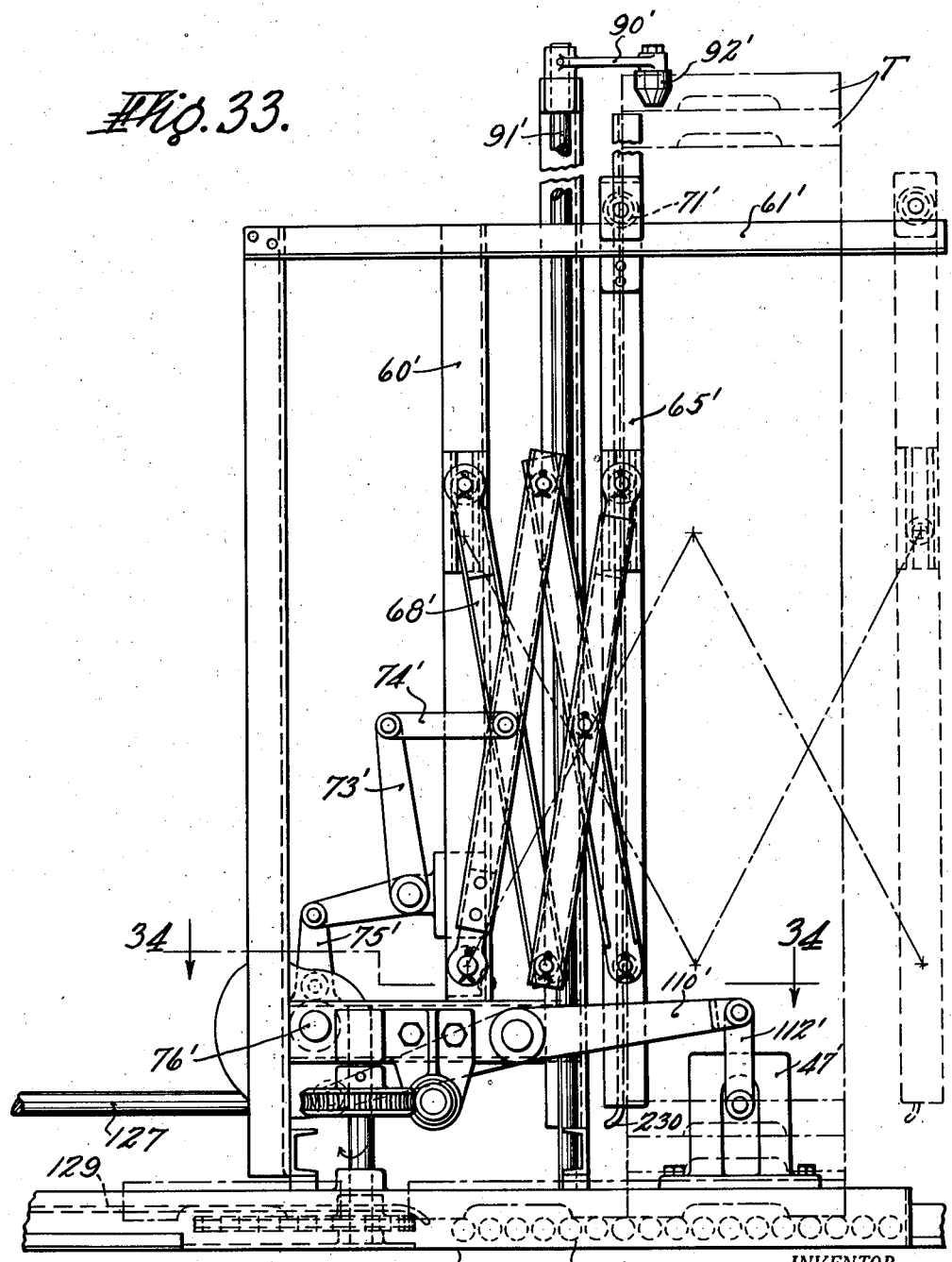

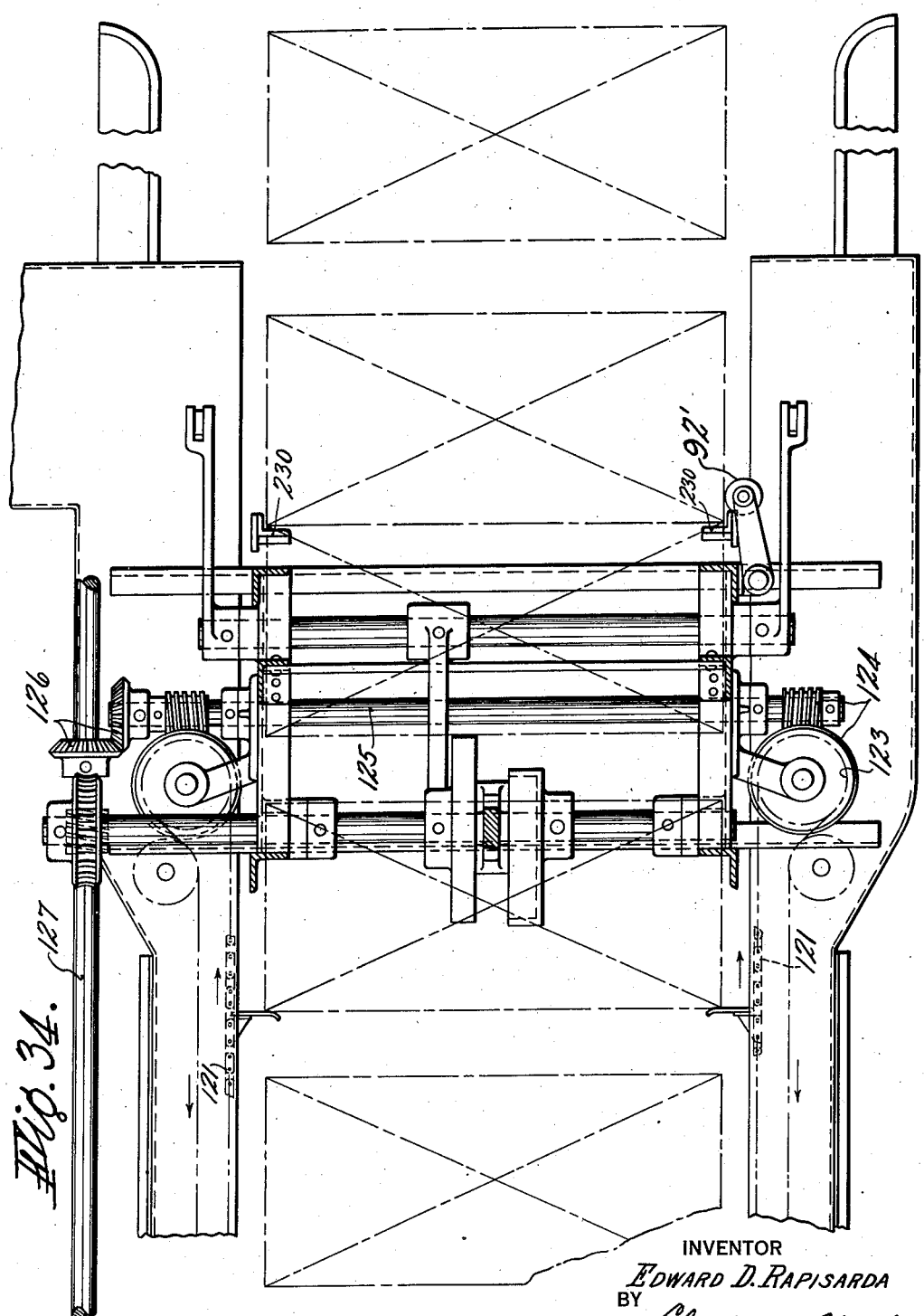

Patented Jan. 21, 1936

2,028,410

UNITED STATES PATENT OFFICE 2,028,410

METHOD AND APPARATUS FOR HANDLING STARCH IN CONFECTIONERY MANUFACTURE

Edward D. Rapisarda, Agawam, Mass., assignor to National Equipment Company, Springfield, Mass., a corporation of Massachusetts Application July 19, 1934, Serial No. 735,994

30 Claims. (Cl. 107—3)

In the manufacture of confectionery it has been customary for some time to form the centers, which are to be coated for example with chocolate, by casting them in molded depressions formed in a matrix of powdered starch. The starch is usually contained in shallow trays, and is subjected to a printing or stamping operation to produce the multiple depressions in its surface in which the candy is to be formed. The filled trays are stacked and left for a sufficient time to permit the candy centers to reach the desired consistency. It is then necessary to remove the confections and the starch from the trays, separate the starch from the confections, and refill the trays with starch before subjecting them again to the printing operation. Prior devices for removing the confections and starch and for later separating them have necessitated the inversion of the trays to dump out their contents. This has of course required an intermittent feed of the trays and also the handling of the trays at a substantial elevation so that the screens or other means for separating the starch from the candy centers could be placed below this line of travel.

One of the objects of the present invention is to remove the candy centers and the starch from the trays without requiring the inversion of the tray. A further object is to improve the manner and the degree of separation of the starch from the candy centers, resulting both in a greater freedom of the candy centers from adhering starch and a greater freedom from floating starch in the room in which the operation is carried on. A further object is to provide a mechanism for this purpose in which no handling of individual trays is required, and which will deal automatically with the high stacks of trays commonly met with in candy factories. A further object is to provide a mechanism for this general purpose having a high degree of compactness, so that a minimum of floor space is required. Additional objects will appear from the following description and claims.

Referring to the drawings,

Fig. 1 is a side elevation of an apparatus embodying my invention;

Fig. 2 is a diagrammatic view illustrating the manner in which the starch and candy centers are removed from the trays and in which the starch is separated from the candy centers;

Fig. 3 is a top plan view, with certain parts broken away, of the mechanism for handling the starch and candy centers;

Fig. 4 is a section through that apparatus taken on a horiodntal plane shown at line 4—4 of Fig. 6;

Fig. 5 is a side elevation of said apparatus looking in the same direction as in Fig. 1;

Fig. 6 is a section on line 6—6 of Fig. 5;

Fig. 7 is a detail elevation of the apparatus showing the mechanism for giving a final cleaning operation to the candy centers;

Fig. 8 is a plan view, partly in section, showing the device for separating the candy centers from the starch;

Fig. 9 is a detail section taken on line 9—9 of Fig. 13 and showing a portion of the mechanism for returning the starch to the trays;

Fig. 10 is a detail of an adjustable air leak shown in Fig. 7;

Fig. 11 is a view similar to Fig. 8 but showing the parts in a different position of operation;

Fig. 12 is a perspective detail of one of the tray elevating fingers;

Fig. 13 is a vertical section taken on line 13—13 of Figs. 6 and 14;

Fig. 14 is a section on line 14—14 of Fig. 6;

Fig. 15 is a detail elevation of a portion of the mechanism for removing the lowermost tray from a stack;

Fig. 16 is a plan view of the mechanism shown in Fig. 15;

Fig. 17 is a side elevation of said mechanism;

Fig. 18 is a section on line 18—18 of Fig. 17;

Fig. 19 is a similar view taken on a slightly different sectional plane and with certain parts broken away to show further construction;

Fig. 20 is a detail of the tray supporting rollers on which the tray stacks are fed to and removed from the mechanism;

Fig. 21 is a plan view of the main cam shaft for the tray feeding mechanism, taken on line 21—21 of Fig. 32;

Fig. 22 is a detail of the stack feeding cam;

Fig. 23 is a detail of the tray lifted cam used in removing the lowermost tray from the stack;

Fig. 24 is a detail of the cam operating the cut-off plate which prevents the deposition of starch between successive trays;

Fig. 25 is a detail similar to Fig. 19 but showing the parts in a different position of operation;

Fig. 26 is a section on line 26—26 of Fig. 32;

Fig. 27 is a section on line 27—27 of Fig. 32;

Fig. 28 is a section on line 28—28 of Fig. 32;

Fig. 29 is a detail of the stack ejector cam;

Fig. 30 is a detail sectional plan showing the pusher which removes a completed stack of filled trays from the machine;

Fig. 31 is a detail of the stack feeder locking cam;

Fig. 32 is an elevation similar to a portion of Fig. 1 but on an enlarged scale showing the stack feed mechanism;

Fig. 33 is a similar elevation corresponding to a portion of Fig. 1, but on an enlarged scale, showing the mechanism for discharging a completed stack of filled trays from the machine; and Fig. 34 is plan view of a portion of the mechanism shown in Fig. 33 (line 34—34 of Fig. 33).

Referring first to Fig. 1, which shows the general arrangement of apparatus, the reference character A refers to a device for receiving a stack of trays containing candy centers embedded in a starch matrix, for moving that stack into unloading position and for removing successively the lowermost trays from the stack and delivering them to the starch removing device. The reference character B denotes a mechanism for removing the starch matrix together with the embedded confections from the tray, separating the confections from the starch, separating any broken candy pieces from the starch, and returning the starch to the tray. The filled trays are then acted upon by a stamping or printing mechanism C which operates to form molded impressions in the starch matrix and to compact the matrix so that it is in condition to receive the candy centers. The depressions thus formed are then filled by a depositing mechanism D, by which a measured quantity of candy material is placed in each of the previously formed candy depressions. The printer and the depositor are not described in detail as they do not specifically form a part of the present invention. Certain aspects of these mechanisms are claimed in copending applications. After the trays have thus been refilled they are received by a mechanism E which piles the trays once more in stacked formation and delivers the piled stack to a position where it can be removed. It will be observed from Fig. 1 that the entire course of the trays is at a level above the floor only sufficient to permit the handling of the complete stacks by a lifting truck of usual construction. This relatively low travel of the trays is made possible by the novel separating mechanism to be described later and is of great importance in that it permits the use of full height stacks and in that it does not require that the trays be fed manually into the starch and confection removing device.

Before considering the separating mechanism, which forms the nucleus of the invention, the device for feeding the trays will be considered. Referring particularly to Figs. 15 to 32, a pair of angle irons 40 are mounted upon the floor at a distance apart slightly less than the feet F of the trays T, and as will be seen from Fig. 15 permit the lowermost tray T to be spaced a very slight distance above the floor line 41; sufficient, however, to permit the tray to be engaged by the platform of the usual lifting truck. To these angle irons are secured a series of rollers 42 mounted as will be shown most clearly in Fig. 20. Each roller is there shown as carried by a stud 43 and held in place by a washer 44, a needle bearing 45 serving to reduce friction. These rollers are on the outer sides of the angle irons and are engaged by the feet of the lowermost tray of the stack so that the stack can be pushed as a unit along the rollers without much friction. It is necessary to remove trays from the bottom of the stack successively, and for this purpose it is necessary to free the lowermost tray from the pressure of those trays above it. In the present case this is done by fingers which engage the next to the bottom tray between its feet and lift it and the stack above it slightly clear of the lowermost tray so that the latter is free to be moved out from under the thus elevated stack. On side frames 46 are mounted vertical slideways 47 on which a slide 48 is reciprocated vertically by mechanism which will be described later. Each of these slides 48 carries a finger 49 shown in detail in Fig. 12.

Each finger is mounted on a shaft 50 journaled in the slide and which carries an eccentric collar 51 upon which is mounted a stud 52 serving to swing the finger from the full line position of Fig. 18 to the dotted line position in the same figure. The finger also carries a ledge 53 and is formed with flattened portions 54 which are adapted to be engaged by springs 55 shown in Figs. 16, 18, and 19, and which function to maintain the finger in any position to which it has been rotated. The studs are adapted to strike a plate 56 (Fig. 19) on the upstroke of the slide, this plate having a beveled bottom 57 serving, as is shown in that figure, to turn the fingers from the dotted line to the full line position. At the bottom of the stroke of the slide the stud 52 is adapted to strike a stationary stop 58 (Fig. 18) by which the fingers are turned again into the dotted line position. When the fingers are swung into the full line position of Fig. 18 they pass underneath the sides of the tray at a point intermediate the feet F and as the slide 48 moves upwardly the tray stack is lifted off from the bottommost tray a slight amount, sufficient to free that tray from any interference by the main stack. In order to give the fingers rigidity during this operation the ledge 53 is provided, which strikes against an abutment 59 carried by the slide as is clearly shown in Fig. 18. With a stack in position adjacent the fingers 49 the latter will function to release the trays successively from the bottom of the stack and to free these lowermost trays so that they may be carried into the subsequently operating mechanism one at a time.

The stacks of trays may be positioned manually on the rollers 42 into position opposite the fingers 49. It is, however, desirable to provide an automatic mechanism for dealing with the stacks so that when the last tray is removed from the stack from which trays are being fed, a fresh stack will be moved into position. Referring now to Fig. 32, the stack feeding mechanism is supported in part from vertical angle irons 60 which beside their supporting function serve as a stop, as shown in Fig. 15, for limiting the forward motion of the stack. The angle irons terminate short of the lowermost tray, so that they will not interfere with its forward movement. Horizontal rails 61 are secured to these vertical angle irons and are also joined to a brace 62 and to upright members 63. A carrier 65 is fitted for sliding movement upon each of the rails 61. For this purpose each carrier is provided with a hanger 66, Figs. 27 and 32, which carries a grooved roller 67 adapted to run on the top of the rails. The carrier 65 is moved back and forth with a parallel motion by a lazy tongs structure 68, secured to the upright 60 and the carrier 65 by pivots 69 and 70. The upper ends of the lazy tong links are fitted with rollers 71 best shown in Fig. 28, which ride in slotted members 72 secured to the members 60 and 65. The lazy tongs is driven from a bell crank 73 by a link 74 coupled to one of the intermediate pivots of the bell crank.

A link 75, slotted to receive the main cam shaft 76, is coupled to the bell crank 73 and has a roller 77 running in a face cam 78 driven by a sleeve 79 on the shaft. When the sleeve is rotated as will be described below, the bell crank will be rocked and the carrier 65 moved from the full line position of Fig. 32 to the dotted line position of that figure, a considerable magnification of motion occurring because of the lazy tongs drive.

To each of the carriers 65 is preferably welded a tube 80 to strengthen it, although of course other forms of construction could readily be used. Through slots in each carrier pass a plurality of bell cranks 81 pivoted at 82 in brackets 83 secured to the carrier 65. These bell cranks are held in the full line position of Fig. 26 by springs 84. An upright member 85 is secured to each series of bell cranks and serves as a contact piece for engaging the rear of a stack of trays. Upon the exhaustion of a stack of trays opposite the tray removing device the carriers 65 are moved rearwardly by their lazy tongs drive. A fresh stack of trays S, Fig. 32, has meanwhile been brought manually into position on the rollers 42. The fingers 81 will strike the trays of this stack and during the rearward movement of the carrier they will be tilted into the dotted line position of Fig. 26. As soon as the fingers pass the rear edge of the stack they will be snapped outwardly by their springs 84 and when the carrier again moves forwardly the uprights 85 will engage the rear of the stack as shown in Fig. 26. During the forward movement of the carrier the bell crank fingers 81 will be held firmly in position by their engagement with the rear side of the slots in the carrier members.

Where the automatic stack feed is employed it is of course desirable to have it operate as soon as the stack in loading position has been exhausted. For this purpose an arm 90 (Figs. 17 and 19) is secured to a vertical shaft 91 journaled upon one of the upright members 60, and carries a roller 92 adapted to contact with the side of the stack. This roller is preferably tapered on its upper side so that as the lowermost tray in the lifted stack is lowered the trays will pass over it without interference. Referring particularly to Figs. 17 and 21, an arm 93 is secured to the upper end of the shaft 91 and bears a pin 94 joined by a spring 95 with a stationary lug 96. The arm 93 also engages a collar 97 slidably mounted on a rod 98 and adapted to exert force longitudinally of the rod by means of collars 100, between one of which and the arm is mounted a spring 99. The rod 98 is slidably mounted in brackets 100 and bears a yoke 102 engaging a clutch member 103 keyed for sliding movement upon the shaft 76. A second clutch member 104 is secured to the sleeve 79 previously referred to. The rod 98 also bears a conical member 105 adapted to engage a depression in a locking disk 106 shown in detail in Fig. 31.

When the parts are in the position shown in Fig. 21 the shaft 76 is in constant rotation, but due to the separation of the clutch members 103 and 104 the sleeve 79 and the stack feeder cam 78 carried by it are stationary. The sleeve is held in a predetermined locked position by the engagement of member 105 with the locking disk 106. As soon as the last tray has been fed from the stack the roller 92 will be permitted to swing from the left (Fig. 21) shifting the rod 98 so that the engagement of members 105 and 106 is broken and the clutch 103, 104 simultaneously engaged. This will cause the stack feeding mechanism of Fig. 32 to reach out, grasp a fresh stack and draw it into place. As the stack comes into place it will engage the roller 92 and shift it so as to bring the sleeve 79 once more to rest. The parts and the stack of trays have considerable momentum and it will be observed from Fig. 21 that this engagement occurs shortly before the stack reaches the stop 63. The roller 92, being forced out by the stack, compresses the spring 99, so that as soon as the cam 106 permits the clutch will be disengaged.

It is also desirable that the stack lifting fingers be kept free from engagement with the incoming stack and a simple mechanism for this purpose has therefore been provided. The control is obtained through the roller 92 previously described, and a similar roller on the other side of the machine, the parts of which being similar to those connected with roller 92, except for their coupling to rod 98, have been indicated by primed numerals. Referring particularly to Figs. 17 and 21, arms 110 are fixed upon a shaft 111 and are coupled by links 112 to the vertical slides 48 which carry the lifting fingers. An arm 113 is secured to the shaft 111 and bears a roller 114 which engages a cam 115 fixed upon the shaft 76 and therefore revolving continuously. On the vertical shaft 91 is a lost motion connection 116 between the arm 90 and an arm 117 which carries the plate 56 previously referred to. A coiled spring 118 holds this latter arm normally against an adjustable stop 119 (Fig. 19). A description of the operation of the mechanism at one side will suffice as the two sides operate identically. As long as the roller 92 is held out by the presence of a stack the plate 56 will be held in its outermost position, so that the stud 52 on the lifting finger will contact the beveled bottom of the plate each time the finger rises. The finger will thus be introduced between the feet of the next to the bottom tray and the stack will be lifted. If no tray is present the roller 92 will move inwardly as described and the plate 56 will be shifted to the position shown in Fig. 25 where the stud 52 can rise behind it. The finger will thus be maintained in its inactive position throughout its reciprocation.

Assuming now that a tray has been released from the bottom of the stack on rollers 42, it will be met by paddles 120 (Fig. 16) carried upon a continuously moving chain 121. This chain is carried on sprockets 122 and 123, the latter of which are driven as shown in Fig. 34 by a worm drive 124 from a shaft 125. This shaft is in turn driven by beveled gears 126 from a longitudinal shaft 127 which serves as a main drive for the machine. The shaft 76 is driven from this longitudinal shaft by a worm connection 128 (Fig. 21). The trays pass from the rollers 42 upon longitudinal rails 129 along which they are slid by the opposed paddles 120. It will be observed that the motion of the trays through the portion of the mechanism about to be described is continuous, the apparatus differing from earlier devices in which it was necessary to interrupt the forward moving of the trays in order to remove the starch and confection from them.

Before considering the detailed structure of the starch removing and separating mechanism its general operation will be described with relation to the schematic diagram of Fig. 2. The trays are passed continuously underneath a nozzle 135 which merges into an ascending duct 136. The cross-sectional area of this duct is preferably kept substantially constant during its vertical extent so that the velocity of the air through it will be sufficient to lift both the starch and the embedded confections and carry them upwardly against the force of gravity. The duct 136 merges into an enlargement 137 which reduces the velocity of the air to a point where the confections can no longer be maintained in suspension. These confections drop into a conduit 138 in which there is preferably an ascending current of air of much smaller magnitude than the air in conduit 136 but which will reduce the rapidity with which the confections fall and therefore reduce the danger of damage to them. The sides of the enlargement are preferably made adjustable as will be described later so that there will be no danger of the confections being carried beyond it, and at the same time the starch and any small broken pieces will be maintained in suspension. As a safety measure it may be desirable to provide a screen 139 of very coarse mesh to prevent the confections being carried along the air stream but in actual operation very few if any of the confections will strike the screen.

Beyond the screen is a second enlargement 140 which reduces the velocity of the air to a point in which any caked starch particles or any so-called tailings or broken pieces of candy will be deposited and from which they can be removed through an outlet 141. The starch laden air then passes into a centrifugal separator 142 having an outlet 143 at its bottom and which may be of any standard type. In this separator the bulk of the starch is removed from the air. The separation is, however, incomplete, and in the preferred form no attempt is made to secure complete separation. Perhaps ten or twenty per cent of the starch is in constant circulation in the air stream. An air outlet 144 extends from the top of the separator to a fan 145 which provides continuous circulation of the air through the system described. Alternative passages are provided from the fan for a purpose to be described later, the air being sent down ducts 146 and 147 in accordance with the setting of a valve 148. The portion of the air passing down duct 146 enters a hood 149 which preferably surrounds the nozzle 146 and is open at its bottom. A downward current of air is thus obtained which assists in loosening the starch and furnishes an ample supply of air to enter the nozzle and carry the starch and confections with it.

The duct 147 leads to a filter 150 of a standard type by which the air reaching it is separated with substantial completeness from the starch, the latter falling into a conduit 151 and the air passing into the room or to some outside point. The starch from conduit 151 is dropped by means of a gate 152 into the hood 149 where it will be immediately picked up and recirculated through the system. The purpose of the filter is to remove a fraction of the air from the circulating system and therefore to maintain the system under slightly sub-atmospheric conditions. By this means any gap or leak in the system is automatically provided with an inrushing current of air and discharge of starch dust into the room is prevented. This is particularly desirable underneath the hood 149 since a gap must necessarily be left at this point in order to permit the insertion of the trays. A further advantage of this sub-atmospheric condition is that it provides for an ascending current of air through the outlet 138 and therefore both assists in completing the separation of the starch from the candy and cushions the fall of the confections. It may be desirable in some cases to supply conditioned air to the system in order to eliminate the necessity for taking out the starch and drying it as has been customary. With the system described this can easily be done. A conventional air conditioning unit has been shown at 153 connected to the duct 146, the only difference in operation where conditioned air is to be used is that the valve 148 is set to remove a much larger portion of air from the circulatory system, thus necessitating constant replenishment through the air conditioner.

Since the mechanical devices by which this sequence of operations is carried out are dissimilar in appearance to the conventionalized forms shown in the diagram they will be denoted by separate reference characters. The separator housing is indicated at 160 with its conical bottom 161 extending downwardly, as indicated in Fig. 13, just above the line of trays. Joined to the casing of the separator and enclosing the remaining ducts is a casing 162. The nozzle 163 corresponding to the nozzle 135 of the diagram extends transversely across the trays and has an upwardly extending portion of substantially uniform cross-sectional area, although the shape of the cross-section may vary. The ascending air current is, therefore, maintained at a substantially uniform velocity during the operation of packing up the starch and candy and transferring them to the first separating chamber. At its upper end the nozzle merges into a lateral duct 164 one side of which is bounded by a curved wall 165, best shown in Figs. 8 and 11. The other side of this duct is formed by a valve 166 by which the degree of the enlargement 137 can be varied to suit different types of candy. A screen 167 corresponding to the screen 139 of the diagram is shaped as shown in Figs. 8 and 11 to catch any candies which have a tendency to carry beyond the enlargement, although if the valve 166 is set correctly this will not happen.

Beyond the screen the duct is still further enlarged, as at 168, to drop out any compacted starch or candy tailings and this latter enlargement opens as at 169 into the side of the separator casing 160. As is well understood, the dust-laden air enters these separating chambers tangentially, dropping out the suspended particles, and passes out through a central opening to the fan 145. Since this particular portion of the apparatus is conventional the fan has not been shown in detail, the fan motor, however, appearing at 170. Leading from the fan casing is a duct 171 corresponding to the duct 146 of the diagram and having in it a valve or shutter 172 provided with a handle 173. The duct 161 surrounds the nozzle 163 and terminates in an extension 174 which overlies the incoming trays. The velocity of air coming down the duct 171 is thus reduced at a point directly over the trays and the danger of forcing starch dust out around the trays is greatly decreased. At the other side of the valve 172 is a duct 175 corresponding to the diagrammatic duct 147 and leading to a filter 176. This filter is preferably constructed of a plurality of fabric tubes stretched between suitable perforated headers and is standard for handling dusty air. The lower ends of the tubes open into a bin 177 which can be emptied by means of a trap door 178 into the lower portion of the duct 171, as shown in Fig. 6. The starch thus emptied will be immediately picked up by the nozzle 163 and recirculated through the system. To permit the exit from the system of the air passing through the filter louvers 179 are provided in the casing 162. An opening 180 is also provided by which the candy tailings may be removed when they have accumulated to an undesirable extent.

The manner in which the candy is removed is best shown in Fig. 7. The first enlargement 137 leads to an outlet 185 merging in a slanting chute 186. The bottom of this chute preferably has a stationary brush 187 and revolving brushes 188 which may be set at an angle if desired, joined by belts 189. A belt 190, connected to one of the brushes from a motor 191, permits all the brushes to be revolved in a direction against the motion of the candy. Any adhering starch particles are thus removed. At the lower end of the chute, driven from one of the brushes by a belt 192, is a star wheel 193 operating on the principle of a revolving door to let the candy out an opening 194 while letting a minimum amount of air in. It is desired, however, to have a regulated amount of air passing up the chute and for this purpose an air vent 195 is provided in the bottom of the chute near its lower end. A plate 196 is pivoted to the chute at 197 and has a slot and screw adjustment 198, 199 by which it may be held in position to uncover as much of the opening as may be desirable. The upward air current from the star wheel and from this opening 195 serves a double purpose. In the first place it picks up any starch particles removed from the candy and carries them back into the circulating system. The inside of the slanting chute is thus kept clean at all times. In the second place the ascending air current passes up the outlet 185 against the descending candy, and reduces the rapidity with which the candy falls into the chute. In actual operation of the device very fragile candy centers have been handled without injury.

As has been mentioned before, the starch deposited within the centrifugal separator 160 is received in its tapered bottom and it is deposited within a tray which has just previously been emptied. One feature of the apparatus is the short space of travel of a tray between the point where it is emptied and the point where it is filled. This is clearly indicated in Fig. 13 where one tray is shown as in process of being emptied underneath the nozzle 163 and the tray ahead of it is just reaching the open bottom of the starch separator.

In order to break up and maintain the proper condition of the starch within the conical bottom of the separator a conveyer 205 is provided having a generally triangular form and bearing a series of pushers 206. The conveyer is mounted upon sprockets 207, 208, and 209, the latter of which is coupled by a chain 210 with the main cam shaft 76. A roller 211 is coupled by gearing 212 to the shaft of the pulley 209, as is best indicated in Fig. 9, and is driven in the direction of the arrow in Fig. 13 so as to smooth off the starch within the tray underneath it and to prevent excess starch being carried out from underneath the separator. During their travel under the roll 214 the trays rest upon a section 216 of the rails 129, these sections being supported upon springs 217 so that slight inequalities in the height of individual trays will cause no disturbance. In order to prevent the escape of starch from the separator in the gap between trays, a cut-off plate 218 is mounted to slide over the trays. This plate is mounted upon a link 219 adapted to be reciprocated by arms 220 which in turn are coupled through a spring 221 to an operating arm 222.

A cam 223 on the cam shaft operates this latter arm and causes the cut-off plate to preserve a gap underneath the wedge-shaped bottom 161 of the separator only when a tray is in position to receive the starch.

When the tray has been refilled and has passed the printer and the depositor C and D, it reaches a stacking and delivering mechanism indicated at E and shown in more detail in Figs. 33 and 34. Since the parts of this device are generally similar to those of the unstacking device previously described they have been denoted by primed numerals insofar as this correspondence exists, and the construction of the stacking device will not be described in detail except to point out the features of difference. As will be apparent from Fig. 33, the roller 92', which corresponds in function to the roller 92 of the previously described mechanism, is inverted, and is located at the top of the stack instead of at the bottom. When a stack has been formed by the constant introduction of trays underneath the progressively lifted stack, the uppermost tray will strike the roller 92'. The stack lifting fingers will then be thrown out of operation and the stack ejector brought into play. The stack ejector is operated by a lazy tongs mechanism in the same way as the stack feeding device, the only difference being that as the only operation required of it is pushing, the tray contacting portion of the ejector comprises a simple angle iron pusher 230, as is clearly shown in Fig. 30. The stack is shifted by these pushers on the rollers 42' in position to be lifted from them and taken away by the usual lifting truck. In neither the unstacking nor the stacking operations are individual trays lifted at any one time more than a short distance, and this lifting is done in each case purely automatically.

The construction of the various specific features of the invention has been described with considerable detail in order to make the description of the entire apparatus clear, particularly in the detailed mechanism for handling the trays. It will be understood, however, that a considerable variation may be made while employing the broader features of the invention. These features of the invention have been pointed out in both their broad and specific aspects in the following claims.

I claim:

1. A method of separating confections from a matrix of starch or the like which comprises raising the confections and starch together against the force of gravity by an ascending air stream, decreasing the velocity of the air stream sufficiently to permit the confections to drop while maintaining the starch in suspension, and passing a current of relatively clean air past the confections thus released and in a direction generally opposed to their motion to separate further particles of starch from the confections.

2. A method of separating confections from a matrix of starch or the like which comprises directing a stream of air against the starch matrix, then directing the stream upwardly and away from the starch matrix with sufficient velocity to float both the confections and the starch, decreasing the velocity of the air stream so that it will float the starch but not the confections, removing the confections from the path of the air stream, and separating at least a portion of the starch from the air stream.

3. A method of separating confections from a matrix of starch or the like which comprises directing a combined stream of air and starch against the starch matrix, directing the stream upwardly and away from the starch matrix with sufficient velocity to float both the confections and the starch, decreasing the velocity of the air stream so that it will float the starch but not the confections, removing the confections from the path of the air stream, separating a portion only of the starch from the air stream, and returning the stream of air and starch to its initial point of engagement with the starch and confections.

4. A device for separating confections from a matrix of starch or the like which comprises means for passing air through a substantially closed circuit having a zone of low pressure and high velocity and at least one zone of higher pressure and lower velocity, means for introducing the matrix with the confections embedded therein into the low pressure zone of the air stream whereby the starch and confections will be picked up and carried away together by the air stream, the velocity of the stream in the second zone being sufficient to maintain the starch but not the confections in suspension, means for separating a substantial portion of the starch from the air stream, and means for diverting continually a fraction of the air from said circuit whereby the pressure therein is maintained below that of the atmosphere.

5. A device for separating confections from a matrix of starch or the like which comprises means for forwarding with an uninterrupted motion a carrier for the starch matrix and the confections, means for directing an air current away from the upper surface of the carrier to convey the matrix and the confections from the carrier while maintaining the carrier in uninverted position and in continuous forward motion, and means for separating the confections and starch from each other.

6. A device for separating confections from a matrix of starch or the like which comprises a conduit having a downwardly directed opening, means for forwarding underneath the opening of the conduit a carrier bearing confections embedded in a matrix of starch, means for causing a current of air to flow through the conduit with sufficient velocity at its point of opening to cause the confections and starch to be lifted from the carrier and to be carried up the conduit, the conduit having an enlarged portion in which the velocity of the air is decreased sufficiently to cause the confections but not the starch to be deposited.

7. A device for separating confections from a matrix of starch or the like which comprises a conduit having a downwardly directed opening, an upwardly extending portion of substantially uniform cross-section, and an enlarged portion, means for forwarding underneath the opening of the conduit a carrier bearing confections embedded in a matrix of starch, and means for moving a current of air through the conduit with a velocity sufficient to cause the starch and confections to be elevated through the upwardly extending portion of the conduit and to maintain the starch but not the confections in suspension in the enlarged portion of the conduit.

8. A device for separating confections from a matrix of starch or the like which comprises a conduit having a downwardly directed mouth, an upwardly extending portion of substantially uniform cross-section, an enlarged portion, and a return portion opening at a point adjacent said downwardly directed mouth, a centrifugal separator interposed in the conduit between said enlarged portion and said return portion, means for forwarding underneath the mouth of the conduit a carrier bearing confections embedded in a matrix of starch, and means for moving a current of air through the conduit with a velocity sufficient to cause the starch and confections to be removed from the carrier and elevated through the upwardly extending portion of the conduit and to maintain the starch but not the confections in suspension in the enlarged portion of the conduit.

9. A device for separating confections from a matrix of starch and the like which comprises a conduit having a downwardly directed mouth, an upwardly directed portion of substantially uniform cross-section, an enlarged portion, and a return portion opening at a point adjacent said downwardly directed mouth, a centrifugal starch separator interposed in the conduit between said enlarged portion and said return portion, a casing enclosing said mouth and the terminus of the return portion of the conduit, means for moving through said casing and underneath the mouth of the conduit a carrier bearing confections embedded in a matrix of starch, means for moving a current of air through the conduit with a velocity sufficient to cause the starch and confections to be removed from the carrier and elevated through the upwardly extending portion of the conduit and to maintain the starch but not the confections in suspension in the enlarged portion of the conduit, an outlet leading from the enlarged portion through which the confections may be removed, means in said outlet for removing adhering starch from the confections, and means for diverting a portion of the air away from the conduit whereby a sub-atmospheric pressure will be maintained in said casing and in said outlet and free starch particles therein will be carried into the main air stream.

10. A device for separating confections from a matrix of starch and the like which comprises a conduit having a downwardly directed mouth, an upwardly extending portion of substantially uniform cross-section, an enlarged portion, and a return portion opening at a point adjacent said downwardly directed mouth, a centrifugal separator interposed in the conduit between said enlarged portion and said return portion, a casing enclosing the mouth and the terminus of the return portion of the conduit, means for moving through said casing and underneath the mouth of the conduit a carrier bearing confections embedded in a matrix of starch, means for moving a current of air through the conduit with a velocity sufficient to cause the starch and confections to be removed from the carrier and elevated through the upwardly extending portion of the conduit and to maintain the starch but not the confections in suspension in the enlarged portion of the conduit, an outlet leading from the enlarged portion through which the confections may be removed, and means for diverting a portion of the air away from the conduit whereby a sub-atmospheric pressure will be maintained within said casing and said outlet and discharge of starch dust therefrom will be prevented.

11. A device for separating confections from a tray-held matrix of starch or the like, which comprises supporting means for engaging the lowermost tray of a stack, said supporting means being at such an elevation as to permit the deposition of a stack of trays thereon by a lifting truck, means for removing trays successively from the bottom of the stack, and means located above the level of said supporting means for removing starch and confections from the trays, separating the starch from the confections, and returning the starch to the trays.

12. A device for separating confections from a tray-held matrix of starch or the like, which comprises supporting means for engaging the lowermost tray of a stack, said supporting means being at such an elevation as to permit the deposition of a stack of trays thereon by a lifting truck, means for removing trays successively from the bottom of the stack, and means located above the level of said supporting means for removing starch and confections from the trays, separating the starch from the confections, and returning the starch to the trays, and means for stacking the filled trays.

13. A device for separating confections from a tray-held matrix of starch or the like, which comprises means for forwarding a succession of trays, means for directing a stream of air upwardly away from the upper surface of the trays being forwarded with sufficient velocity to carry the confections and the starch upwardly out of the trays, and means for separating the starch from the confections.

14. A method of separating materials which comprises conveying the materials together by an air current of sufficient velocity to float both of the materials, decreasing the velocity of the air current sufficiently so that it will float one of the materials but not the other, and permitting the latter material to drop in an ascending current of relatively clean air of sufficient velocity to float the first material only, to remove from the second material residual particles of the first material, and to break the velocity of fall of the second material.

15. A method of separating confections from a matrix of starch and the like which comprises directing a combined stream of air and starch against the starch matrix, directing the stream upwardly and away from the starch matrix with sufficient velocity to float both the confections and the starch, decreasing the velocity of the air stream so that it will float the starch but not the confections, removing the confections from the path of the air stream, separating a portion only of the starch from the air stream, returning the stream of air and starch to its initial point of engagement with the starch and confections, continually diverting a fraction of the air away from the air stream, and introducing conditioned air into the air stream to replace at least a portion of that removed.

16. A device for separating confections from a matrix of starch or the like which comprises means for passing air through a substantially closed circuit, having a zone of low pressure and high velocity and at least one zone of higher pressure and lower velocity, means for introducing the matrix with the confections embedded therein into the low pressure zone of the air stream, whereby the starch and confections will be picked up and carried together by the air stream, the velocity of the stream in the second zone being sufficient to maintain the starch but not the confections in suspension, means for separating a substantial portion of the starch from the air stream, means for diverting continually a fraction of the air from said circuit, and means for introducing conditioned air into the circuit to replace at least a portion of the air so diverted.

17. A device for separating confections from a matrix of starch or the like which comprises means for passing air through a substantially closed circuit having a zone of low pressure and high velocity and at least one zone of higher pressure and lower velocity, means for introducing the matrix with the confections embedded therein into the low pressure zone of the air stream whereby the starch and confections will be picked up and carried away together by the air stream, the velocity of the stream in the second zone being sufficient to maintain the starch but not the confections in suspension, means for separating a substantial portion of the starch from the air stream, an outlet conduit in which the confections are received when released from suspension, means in said outlet conduit for brushing the confections to remove any adhering starch, means for continually removing a fraction of the air from said circuit, and means for admitting air into said outlet conduit to carry back into the main air stream any starch so removed.

18. A device for separating confections from a tray-held matrix of starch or the like, which comprises supporting means for engaging the lowermost tray of a stack, said supporting means being at such an elevation as to permit the deposition of a stack of trays thereon by a lifting truck, means for removing trays successively from the bottom of the stack, means located above the level of said supporting means for removing starch and confections from the trays, and means for separating the starch and the confections from each other.

19. A device for separating confections from a tray-held matrix of starch or the like, which comprises supporting means for engaging the lowermost tray of a stack, said supporting means being at such an elevation as to permit the deposition of a stack of trays thereon by a lifting truck, means for removing trays successively from the bottom of the stack, means located above the level of said supporting means for removing starch and confections from the trays, means for separating the starch and the confections from each other, and means for restacking the trays.

20. A device for separating confections from a tray-held matrix of starch or the like which comprises means for supporting a stack of starch containing trays, means for removing trays successively from the bottom of the stack, means automatically operable upon the exhaustion of the stack for moving a fresh stack onto said supporting means, means for removing starch and confections from the trays after they have been removed from the stack, and means for separating the starch and the confections from each other.

21. A device for separating confections from a tray-held matrix of starch or the like which comprises means for supporting a stack of starch-containing trays, means for removing trays successively from the bottom of the stack, means automatically operable upon the exhaustion of the stack for moving a fresh stack onto said supporting means, means for removing starch and confections from the trays after they have been removed from the stack, means for separating the starch and the confections from each other, means for restacking the trays after the removal of the starch and confections therefrom, and means for ejecting a stack from the machine upon completion.

22. A method of separating relatively heavier articles such as confections from a matrix of a relatively lighter material such as starch, which comprises conveying the confections and starch together by an air stream having sufficient velocity to float both of them, decreasing the velocity of the air stream sufficiently to permit the confections to drop while the starch is maintained in suspension, decreasing the velocity of the air stream a further amount sufficient to release a substantial proportion of the starch from suspension, and returning the air stream to its initial point of engagement with the starch matrix.

23. A method of separating relatively heavier articles such as confections from a matrix of a relatively lighter material such as starch, which comprises subjecting the matrix with the confections embedded therein to the action of an air stream having sufficient velocity to float both the confections and the starch, separating the confections and a portion of the starch separately from the air stream, and returning the air stream with the residue of the suspended starch to its initial point of engagement with the starch matrix.

24. A device for separating relatively heavier articles such as confections from a matrix of a relatively lighter material such as starch, which comprises means for passing air through a substantially closed circuit and with a velocity in one zone of said circuit sufficient to float both the confections and the starch, means for separating the confections and a portion of the starch separately from the air, and a high velocity nozzle situated in the first-named zone of said circuit adjacent which the starch matrix may be moved to cause the confections and the starch to be moved away by the air stream.

25. A device for separating relatively heavier articles such as confections from a matrix of a relatively lighter material such as starch, which comprises means for passing air through a substantially closed circuit and with a velocity in one zone of said circuit sufficient to float both the confections and the starch, means for reducing the velocity of the air stream in another zone of the circuit sufficiently so that the stream will float the starch but not the confections, means for reducing the velocity of the air stream further in another zone of the circuit sufficiently to release a substantial proportion of the starch from suspension, and a high velocity nozzle situated in the first-named zone of said circuit adjacent which the starch matrix may be moved to cause the confections and the starch to be moved away by the air stream.

26. A device for separating relatively heavier articles such as confections from a matrix of a relatively lighter material such as starch, which comprises means for passing air through a substantially closed circuit having a zone of high velocity and at least one zone of lower velocity, means for introducing a matrix of starch with the confections embedded therein into the high velocity zone of the air stream, whereby the starch and confections will be carried together by the air stream, the velocity of the air stream in the second zone being sufficient to maintain the starch but not the confections in suspension, and means for separating a substantial portion of the starch from the air stream during the transit of the air stream from the second zone back to said first-named zone.

27. A method of separating relatively heavier articles such as confections from a compacted matrix of a relatively lighter material such as starch, which comprises subjecting the matrix progressively to the action of a portion of an air stream of sufficiently low pressure and high velocity to cause by its own action the matrix to be disruptively disintegrated and carried away.

28. A method of separating relatively heavier articles such as confections from a matrix of a relatively lighter material such as starch, which comprises subjecting the matrix progressively to the action of a portion of an air stream of sufficiently low pressure and high velocity to cause the disruptive disintegration of the starch matrix and to carry away in suspension both the confections and the so disintegrated matrix, and subsequently segregating separately the confections and at least a portion of the disintegrated starch matrix from the air stream.

29. A method of separating relatively heavier articles such as confections from a compacted matrix of a relatively lighter material such as starch, which comprises supporting the matrix with the confections embedded therein in a substantially impervious tray, subjecting the tray supported matrix progressively to the action of a portion of an air stream of sufficiently low pressure and high velocity to cause the disruptive disintegration of the starch matrix, remove both the starch and the confections from the tray, and carry away both the confections and starch in suspension, and subsequently segregating separately the confections and at least a portion of the disintegrated starch matrix from the air stream.

30. A method of separating confections from a matrix of starch, which comprises subjecting the starch matrix with the confections embedded therein to the action of an air stream of sufficient initial velocity to carry in suspension both the confections and the starch, and segregating the confections and at least a portion of the starch separately from the air stream.

EDWARD D. RAPISARDA.